Patented June 12, 1951

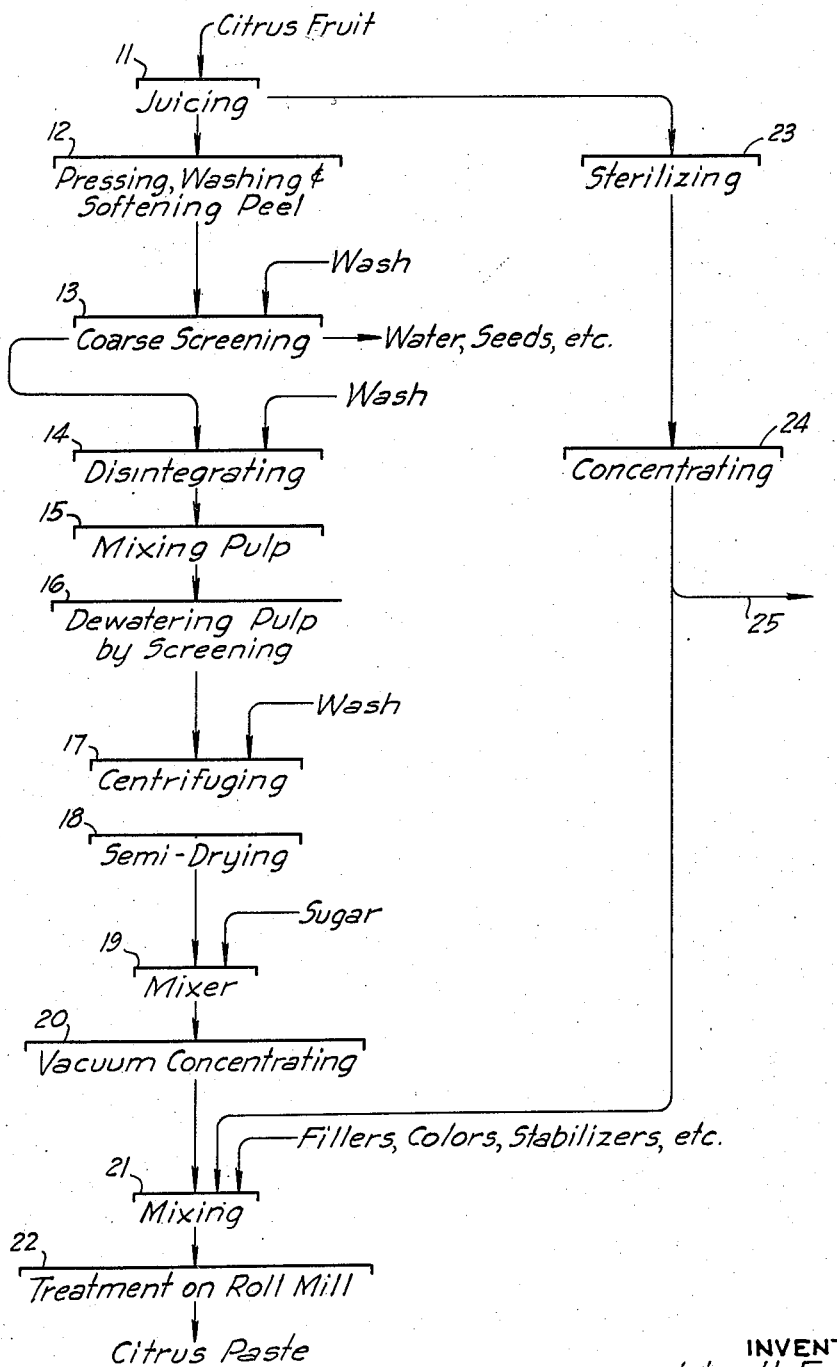

2,556,579

UNITED STATES PATENT OFFICE 2,556,579

PROCESS FOR THE TREATMENT OF CITRUS PEEL

John H. Forkner, Fresno, Calif.

Application June 28, 1949, Serial No. 101,731

8 Claims. (Cl. 99—102)

This invention relates generally to processes for the manufacture of valuable products from the peel of various citrus fruits, and particularly a product useful as a base for the compounding of various other food materials.

It is well known that there is a commercial demand for a high quality base material for mixture with other food materials, such as fruits, fruit flavors, or concentrates. The usefulness and range application for such a base increases with its ability to carry added ingredients, such as fruit juices and sugar. Furthermore its application to the baking industry is dependent in part upon the ability of such compounded products to retain a desired degree of firmness during baking, and to retain a desired physical state after baking. In the past fig paste has been used for this purpose, but its usefulness is limited because when sufficient sugar is added to the fig paste to provide a palatable product, it does not have sufficient carrying properties for desired additions of fruit or fruit concentrates. Another difficulty with fig paste is that its natural flavor cannot be masked by the flavor of added natural fruits or concentrates, and therefore its use has been limited to instances where it is feasible to use artificial or strong flavoring extracts. A further difficulty with fig paste is that its natural buff color detracts from the natural color of added fruits and coloring mediums, and therefore it is not possible to provide various compounded products possessing clear natural colors, simulating for example the natural color of an added fruit.

It is an object of the present invention to provide a novel process for the manufacture of such a base material from the peel of various citrus fruits.

Another object of the invention is to provide a process of the above character which is characterized by a series of steps which can be carried out with relatively low capital investment per ton of material produced.

Another object of the invention is to provide a process of the above character which will result in the production of a base material which is markedly superior to prior citrus products for use in various compounded products.

Another object of the invention is to provide a new base material which possesses novel characteristics, including the ability to readily sustain more than double its weight of added ingredients, a bland flavor which readily lends itself to the addition of fruit concentrates and flavors, and a light color whereby blended products can be prepared having attractive clear color.

Another object of the invention is to provide a novel product of the above character, and process for its manufacture, which will be relatively free of unpleasant bitter or unpalatable flavor, and which will have good keeping qualities provided by delayed development of rancid or bitter elements.

Further objects of the invention will appear from the following description in which the preferred embodiment of the invention has been set forth in detail in conjunction with the flow sheet of the accompanying drawing.

In general the process forming the subject matter of the present invention involves a series of wet treatment operations in which a considerable part of the bitter components of citrus peel is removed. These operations may include pressing, extrusion and washing operations such as are commonly applied for the preparation of citrus pectin peels. During this time the material is of such particle size that it can be readily handled and treated by simple screening operations. After such treatment the material is subjected to one or more vacuum cooking operations, in which further bitter components are renewed by evaporation, and thereafter it is subjected to a special treatment for the elimination of residual pockets of bitter components. The final product is a paste which can be used as a base for compounding various products.

The term citrus fruit as used herein is defined as including oranges, lemons, grapefruit, limes and citrons. The peel of citrus fruit consists of a considerable amount of fibrous material, together with a surface skin which contains citrus oil, terpene and like bitter components.

In the flow sheet of the accompanying drawing I have shown citrus fruit being supplied to the juicing operation 11, where the majority of the juice is removed by conventional means, such as application of halves of the fruit to rotating juicing burrs, or squeezing halves or quarters of the fruit through juicing rolls, followed by screening. The juice thus removed can be treated according to conventional methods. The material remaining after the juicing operation consisting mainly of citrus peel, together with fibrous membrane-like material or "rag," is then subjected to the washing and peel softening operation 12. In this operation the peel is intermingled with water and is subjected to the action of beater arms. It is also desirable to apply pressure to the material prior to or intermediate the washing operations, as by means of a continuous press of the extrusion type, to thereby free the material of bitter components such as are amenable to removal by pressing. This serves to soften the peel and skin surfaces through beating action to dislodge and thus facilitate removal of bitter surface components. In addition it serves to loosen seeds from the peel.

In the next operation 13 the material is subjected to coarse screening, on a screen which may have say one-quarter to one inch mesh openings, whereby seeds, water and other material freely pass through the screen, leaving only the peel. A considerable part of the bitter surface components loosened in the washing operation 12, passes out with the water in the screening operation 13.

In the next operation 14 the peel is disintegrated to a particle size suitable for rapid elimination of remaining bitter elements in the subsequent wet treatment operations, but without producing such a small particle size as would prevent or interfere with separation and washing by the use of screens, centrifuges and like types of equipment. Thus in the operation 14 it is desirable to produce a particle size such that the bulk of the material will range from 6 to 20 mesh in size.

Operation 14 can be carried out by various types of equipment. For example it is possible to use a hammer type of disintegrator in which the particles of the peel are driven through a disintegrating screen ranging from one-quarter to one-half inch openings. A Rietz type of disintegrator can be used with good results, as shown for example in Rietz Patent No. 2,153,590, with the rotor being driven at speeds of the order of from 900 to 3600 R. P. M.. It is also possible to use disintegrating mills of the type in which the peel is reduced to a desired particle size by grating action. In general it is desirable that the bulk of the particles be of such size that they will not pass a 20 mesh screen, but will pass a screen of 6 mesh.

During operation 14 water can be added as illustrated to aid in flushing out the divided material, and to facilitate subsequent separation of bitter components from the material desired. After operation 14 it is desirable to subject the resulting pulp to agitation at 15, after which the pulp is partially dewatered in operation 16, as by screening. It is satisfactory to use a 4 to 20 mesh screen for this operation, because in mass the particles bridge or film over the screen. Wash water can be applied to the material on the screen in order to more effectively separate the desired material from bitter components.

After dewatering at 16 it is desirable to subject the material to a second dewatering operation 17, which can be carried out by one or more types of presses or by centrifuging. Here again it is desirable to apply wash water to the material being centrifuged, in order to more effectively wash away bitter components.

The material after centrifuging at 17 can contain from 10 to 20% solids, and has been freed of the bulk of the bitter peel components. This material is then preferably subjected to a concentrating or semi-drying operation 18 which is carried out by subjecting the material to a drying atmosphere. To carry out this operation it is satisfactory to feed the material into a rotating drum type of drier, through which hot drying air is circulated. Preferably the temperature of the drying air is maintained at a temperature not greater than about 180° F. It it preferable to remove sufficient moisture in operation 18 to provide a pulp containing from about 30 to 60% solids.

The pulp is now combined with a sugar or sugar syrup in the mixing operation 19. Inverted cane sugar in the form of a concentrated syrup (such as 80 Baumé) has been used with good results. While some of the sugar added may not be inverted it is preferable that at least about half the sugar be inverted, with the balance being sucrose. Substantially all the sugar present is in dissolved form.

With respect to the amount of sugar which may be added in operation 19, I may for example use 1200 pounds of sugar solids to about 2100 pounds of citrus material after centrifuging at 17. After treatment in operations 20 and 21, the proportions just specified will yield a material having a refractometer reading of about 75, and which for a 2000 pound batch will comprise 250 pounds citrus solids, 550 pounds moisture, and 1200 pounds sugar. In general the material immediately after mixing at 21 may contain sugar in proportions ranging for example from 250 pounds of citrus solids and 2000 pounds of sugar, as a maximum, to 250 pounds of citrus solids and 500 pounds of sugar, as a minimum, with about 250 pounds of citrus solids and 1200 pounds of sugar being a desirable proportioning. Within these limits the moisture content can be adjusted to adjust the refractometer reading to a desired value.

Following the addition of sugar in the mixing operation 19, the material is subjected to a vacuum cooking and concentrating operation 20. This operation is carried out in suitable equipment which can be maintained under vacuum and which subjects the material to continual agitation while heat is applied to the walls or agitators of the containing kettle or vessel. During the cooking and concentrating operation a vacuum ranging from 20 to 29+ inches of mercury can be maintained, and the material is heated to cause continual ebullition of water vapor. Care is taken to avoid use of such temperatures as tend to cause extensive caramelization of the sugar, or discoloration of the product. During this treatment the material is heated to a temperature of the order of 100 to 170° F., and volatile constituents such as citrus oil are removed by vaporization.

In some instances I prefer to precede the above operation 20 with a short period of pressure cooking at an elevated temperature of say from 212 to 260° F., and with continuous agitation. This can be carried out in the same equipment used for heating under vacuum, by providing a cooker of sufficient strength which can be pressure sealed. When this pressure cooking is employed, it is preferably applied to the citrus pulp before addition of sugar, and the sugar is then applied and intermixed with the pulp in the same equipment.

The material at the conclusion of the vacuum cooking and concentrating operation 20 may for example contain about 70% solids, with about 20% of the total solids being derived from the citrus peel. Also the concentration should be such as to provide a refractometer reading within the range of about from 60 to 87, and preferably from about 72 to 78, with the material at a temperature of 120° F. In taking such readings I have employed a standard refractometer of the Bausch and Lomb type such as is used in the food industry.

Assuming that the material is to be mixed with various additives, such as fillers, colors, flavors, stabilizers, etc., the same can be added in a mixing operation 21 which follows the vacuum cooking and concentrating operation 20.

While the material added at 21 may vary depending on the character of the product desired, reference can be made to the use of defatted coconut fiber as a suitable filler. In some instances it is desirable to reintroduce a part of the juice removed at 11, and in the form of a concentrate. Thus juice removed at 11, after straining, can be heat sterilized at 23 and concentrated at 24. A part of the concentrate may be diverted for other uses as indicated at 25, and the reminder mixed back into the material at 21.

The material is next subjected to a special treatment operation 22 which serves to greatly reduce the particle size of the solids and to produce certain unique properties. For this operation it is satisfactory to use a roll mill of the Lahman-National type consisting of three, four or five rolls operating at progressively increasing speeds as, for example, 20, 60 and 180 R. P. M. for a three roll mill. The peripheries of the rolls are set relatively close together as, for example, with a clearance of the order of $\frac{1}{16}$ inch between the first and second rolls and with the second and third rolls set so close together that there is no visible clearance. The material from the mixing operation 21 is applied to the first roll, and from there progresses between the first and second rolls, and from thence between the second and third rolls, and (for a three roll mill) is finally removed from the periphery of the third roll.

Assuming that the material has a consistency at 120° F. ranging from 60 to 87 refractometer reading (preferably 72 to 78), milling of the character described produces certain remarkable changes in the material. It serves to disperse islands or pockets of bitter components in the paste, whereby such components are homogeneously dispersed throughout the mass, with cells of citrus solids intimately surrounded by sugar, and with sugar forced into the cell structures. This serves to improve the flavor of the finished material, and in addition it has been found that material so treated does not tend to develop bitter or rancid flavors after storage, which is attributed to elimination of bitter concentrate pockets and the more effective sugaring of the fruit cells.

In addition to the foregoing the above milling treatment serves to neutralize or dispel undesirable cooking odors and flavors implanted during cooking. I have particular reference to cooking odors and flavors which tend to be caused because of some carmelization of the sugar content, or decomposition of the citrus peel, and which tend to influence the flavor of the final material. During such milling treatment aeration occurs which apparently has some effect in causing removal of undesired odors and flavors.

A particularly important result obtained by my milling treatment is to greatly lighten or regain the original color, whereby the material will take on the hue of any color which may be added, whether artificial or natural. In other words the material assumes the characteristics of a base which can be colored as desired, without material shading down or color neutralization. In this connection it is desirable to add coloring material before milling because this makes possible a high color luster otherwise impossible to achieve.

To summarize the results secured by milling at 22, it serves to neutralize or inhibit cooked odors and flavors, to eliminate pocketing of undesired elements, to impart or revive original colors through aeration, to impart added luster where colors are added, to impart keeping properties without developing rancidity or bitter flavor, and to eliminate pocketing of flavors such as impart a citrus taste of a character which cannot be masked over by added flavor.

The citrus paste obtained from operation 22 can be used in various ways, particularly as a base for the compounding of other food products. For example, it can be mixed with additional sugar and fillers such as various pectin or oil-free coconut fiber, to form a material suitable for use in various bakery products. It can also be used as an ingredient of confections, ice creams and the like.

It will be evident from the foregoing that my process provides a satisfactory commercial method for the production of valuable products from citrus peel. The majority of the bitter citrus components of the peel are removed in simple wet treatment operations, after which some additional aromatic oil and like bitter elements are removed in the vacuum cooking and concentrating operation 20. It is after such treatment that the material is reduced in particle size in the final milling operation 22, to produce a material of remarkable characteristics as previously described. The product when used as a carrying base for fruit flavors or juices is superior to fig paste, or to pectin or citrus base produced by prior processes.

I claim:

1. In a process for the treatment of citrus peel, the steps of subjecting the peel to disintegrating and wet washing operations to remove the bulk of bitter skin components and to provide a hydrous pulp for further treatment, cooking and concentrating the pulp while subjecting it to a partial vacuum, adding sugar to the pulp, and then treating the pulp to crushing and aeration to disperse remaining pockets of bitter components homogeneously throughout the mass.

2. In a process for the treatment of citrus peel, the steps of subjecting the peel to disintegrating and wet washing operations to remove the bulk of bitter skin components and to provide a hydrous pulp for further treatment, heating the material while subjecting it to a partial vacuum with agitation, adding sugar to the material, and then subjecting the material to milling to disperse pockets of bitter components.

3. In a process for the treatment of citrus peel, removing the bulk of the bitter skin components of the peel, and then milling the peel to disperse remaining pockets of bitter skin components throughout the mass.

4. In a process for the treatment of citrus peel, comminuting the peel and removing the bulk of the bitter skin components, adding sugar to the material and cooking the same, and then milling the material to disperse remaining pockets of bitter skin components throughout the mass, to improve color characteristics by aeration, and to improve the ability of the material to be colored and flavored.

5. In a process for the treatment of citrus peel, the steps of subjecting the peel to disintegrating and wet washing operations to remove the bulk of bitter skin components, and to provide a hydrous pulp for further treatment, cooking and concentrating the pulp while subjecting it to a partial vacuum, adding sugar to the pulp, and then treating the pulp on a roll mill to disperse pockets of bitter components and while the pulp has a refractometer reading within a range of from 60 to 87.

6. In a process for the treatment of citrus peel, the steps of disintegrating the peel to a particle size ranging from about 6 to 20 mesh, washing the resulting pulp to remove the bulk of bitter skin components, and to provide a pulp for further treatment, cooking and concentrating the pulp while subjecting it to a partial vacuum, adding sugar to the resulting pulp, and then milling the pulp to reduce the particle size of the solids and to disperse pockets of bitter components homogeneously throughout the mass.

7. In a process for the treatment of citrus peel, the steps of disintegrating the peel to form a pulp having the bulk of the particles ranging from 6 to 20 mesh, subjecting the pulp to washing operations to remove the bulk of the bitter skin components, and to provide a pulp for further treatment, adding sugar to the pulp, cooking and concentrating the pulp while subjecting it to a partial vacuum, adding sugar to the pulp to provide a paste having a refractometer reading within the range of from 60 to 87, and then treating the pulp to milling to reduce the particle size of the solids, to disperse pockets of bitter components homogeneously throughout the mass, and to improve flavor, odor and color characteristics.

8. In a process for the treatment of citrus peel, the steps of subjecting the peel to disintegrating and wet washing operations to remove the bulk of bitter skin components and to provide a hydrous pulp for further treatment, heating the pulp to an elevated temperature while subjecting it to a partial vacuum to concentrate the same and to effect removal of undesirable components, adding sugar and coloring to the material, and then treating the pulp on a roll mill to disperse pockets of bitter components and to provide a color of high luster by aeration.

JOHN H. FORKNER.

REFERENCES CITED

The following references are of record in the file of this patent:

UNITED STATES PATENTS

| Number | Name | Date |
|---|---|---|
| 2,209,889 | Lachman | July 30, 1940 |
| 2,407,801 | Steinwand | Sept. 17, 1946 |

FOREIGN PATENTS

| Number | Country | Date |
|---|---|---|
| 21,018 | Australia | of 1935 |